Nov. 13, 1923.

H. A. KAUFLE

WASHING MACHINE

Filed June 3, 1922

H. A. Kaufle
INVENTOR

BY Victor J. Evans
ATTORNEY 1,474,041

Patented Nov. 13, 1923.

1,474,041

UNITED STATES PATENT OFFICE.

HENRY A. KAUFLE, OF CHARLEROI, PENNSYLVANIA.

WASHING MACHINE.

Application filed June 3, 1922. Serial No. 565,559.

*To all whom it may concern:*

Be it known that I, HENRY A. KAUFLE, a citizen of the United States, residing at Charleroi, in the county of Washington and State of Pennsylvania, have invented new and useful Improvements in Washing Machines, of which the following is a specification.

This invention relates to washing machines, and more particularly to a machine for washing clothes and similar articles.

One of the main objects of the invention is to provide a machine of simple construction and operation which will exert a combined rubbing and compressing effect upon the articles being washed so as to force the washing solution through the same in such a manner as to readily loosen and remove the dirt particles. A further object is to provide a machine having means by which smaller articles may be washed separately from and simultaneously with larger articles. Further objects will appear from the detailed description.

In the drawings:—

Figure 1:
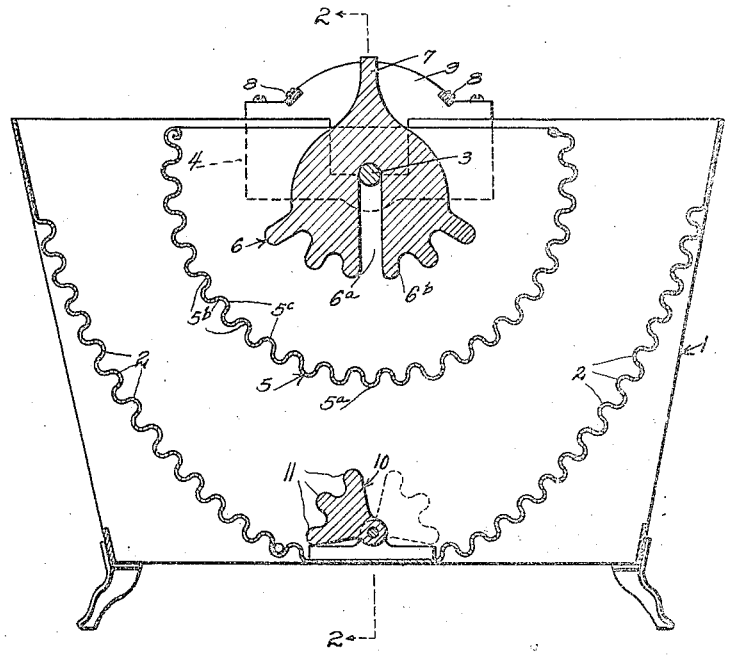
Figure 1 is a central longitudinal vertical section through the machine.
Figure 2:
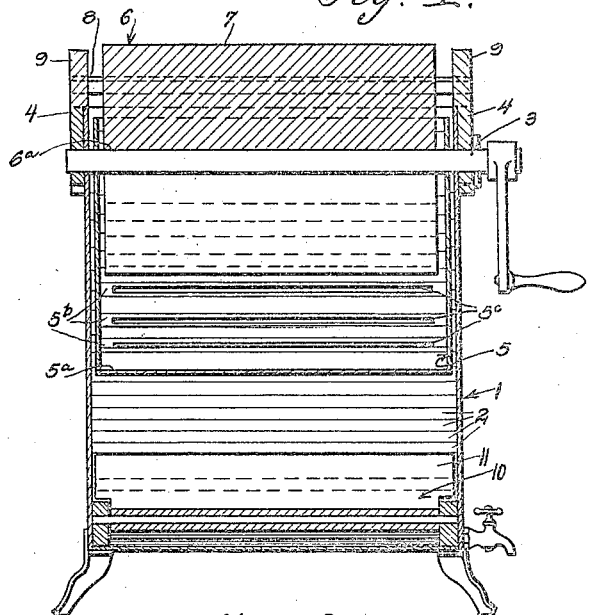
Figure 2 is a transverse vertical section through the machine.

The machine includes a tub or casing 1 on the inner face of which are disposed a plurality of transverse rubbing members or ribs 2, these ribs being disposed in concentric relation to an operating shaft 3 rockably mounted in bearing blocks 4 secured on the upper edges of the side walls of the casing. A main rubber 5 is secured on shaft 3, the bottom wall 5ᵃ of this rubber being disposed substantially concentric with shaft 3 and having a plurality of transversely extending corrugations forming ribs 5ᵇ between which are slots 5ᶜ for establishing communication between the interior of casing 1 and the interior of rubber 5. A supplemental rubber 6 rests loosely upon shaft 3 within rubber 5, this supplemental rubber being provided with a slot 6ᵃ for reception of the shaft. The underface 6ᵇ of supplemental rubber 6 is corrugated to provide a rubbing surface and is curved on a greater arc than the arc of curvature of bottom 5ᵃ of rubber 5. This supplemental rubber is further provided with an upwardly projecting stem 7 which is positioned to strike cross-bars 8 which connect bows 9 secured on the sides of the casing and extending over bearing blocks 4. The stem 7 and bars 8 co-operate to limit movement of the supplemental rubber in either direction.

The ribs 2 are separated into two series, one in each end portion of casing 1, and a rubber 10 is rockably mounted in the casing between the series of ribs, this roller being provided on its upper portion with a plurality of radiating ribs or blades 11 extending transversely of the casing. In using the machine the larger articles are placed in casing 1, the smaller articles being placed within the supplemental rubber 5, it being understood that a quantity of washing solution is placed within the casing, the level of the washing solution extending above the lower portion of the supplemental rubber. The operating shaft 3 is then rocked by means of a crank 12 secured on one end of the shaft, or in any other suitable or preferred manner. This imparts rocking movement to rubber 5 which serves, in conjunction with ribs 2 of the casing, to compress and rub the mass of clothes, the mass being moved downwardly over one set of the ribs onto the blades or ribs 11 of rubber 10 which then turns or rocks so as to throw the mass of clothes against the other set of ribs thus forcing the washing solution through the clothes. This operation is repeated and reversed as the shaft is rocked in the opposite direction. This serves to subject the clothes to a combined rubbing and squeezing or compressing action which serves to effectually loosen and remove the dirt particles. The smaller articles are placed within the rubber 5 where they are subjected, during the rocking of shaft 3 to the combined rubbing and compressing action of ribs 5ᵇ and the supplemental rubber 6 which serves to effectually loosen and remove the dirt particles. This provides very simple and efficient means whereby the smaller articles of clothing may be washed separately from and simultaneously with the other articles, all of the articles being subjected to a combined rubbing and compressing action which serves to quickly and effectually remove the dirt particles.

As will be understood, changes in details of construction and arrangement of parts of the invention may be resorted to without departing from the field and scope of the same, and I intend to include all such variations, as fall within the scope of the appended claims, in this application in which a preferred form only of my invention is disclosed.

What I claim is:

In a machine of the character described, a casing, a plurality of ribs within the casing and extending transversely thereof, a shaft rockably mounted transversely of and extending through the casing, a main rubber fixed to said shaft and having its lower wall transversely corrugated and disposed substantially concentric with said ribs, said main rubber being further provided with openings through its lower wall, a supplemental rubber loosely mounted on the shaft and positioned within said main rubber, means for limiting movement of said supplemental rubber in either direction and means to rock said shaft.

In testimony whereof I affix my signature.

HENRY A. KAUFLE.